United States Patent
Higgins

(10) Patent No.: US 7,589,743 B2
(45) Date of Patent: Sep. 15, 2009

(54) HUE ANGLE CALCULATION SYSTEM AND METHODS

(75) Inventor: Michael Francis Higgins, Cazadero, CA (US)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 52 days.

(21) Appl. No.: 11/196,631

(22) Filed: Aug. 2, 2005

(65) Prior Publication Data

US 2005/0264580 A1 Dec. 1, 2005

Related U.S. Application Data

(62) Division of application No. 10/691,200, filed on Oct. 21, 2003, now Pat. No. 6,980,219.

(51) Int. Cl.
*G09G 5/02* (2006.01)

(52) U.S. Cl. .................. 345/590; 345/589; 345/595; 345/601; 345/602; 358/519; 358/520; 382/162

(58) Field of Classification Search .................. 345/595
See application file for complete search history.

(56) References Cited

U.S. PATENT DOCUMENTS

| | | | |
|---|---|---|---|
| 4,439,759 A | 3/1984 | Fleming et al. |
| 4,737,843 A | 4/1988 | Spencer |
| 4,946,259 A | 8/1990 | Matino et al. |
| 5,233,385 A | 8/1993 | Sampsell |
| 5,416,890 A | 5/1995 | Beretta |
| 5,438,649 A | 8/1995 | Ruetz |
| 5,448,652 A | 9/1995 | Vaidyanathan et al. |
| 5,450,216 A | 9/1995 | Kassan |
| 5,642,176 A | 6/1997 | Abukawa et al. |
| 5,661,371 A | 8/1997 | Salerno et al. |
| 5,694,186 A | 12/1997 | Yanagawa et al. |
| 5,719,639 A | 2/1998 | Imamura et al. |
| 5,724,112 A | 3/1998 | Yoshida et al. |
| 5,724,442 A | 3/1998 | Ogatsu et al. |
| 5,731,818 A | 3/1998 | Wan et al. |
| 5,748,828 A | 5/1998 | Steiner et al. |
| 5,751,268 A | 5/1998 | Sheridon |
| 5,845,532 A | 12/1998 | Phillips |
| 5,880,707 A | 3/1999 | Aratani |
| 5,899,550 A | 5/1999 | Masaki |
| 5,903,366 A | 5/1999 | Hirabayashi et al. |
| 5,917,556 A | 6/1999 | Katayama |
| 5,929,843 A | 7/1999 | Tanioka |

(Continued)

FOREIGN PATENT DOCUMENTS

JP 6-261332 9/1994

(Continued)

*Primary Examiner*—Antonio A Caschera
(74) *Attorney, Agent, or Firm*—Haynes and Boone LLP

(57) ABSTRACT

One system includes at least one input channel, an octant determining unit, an angle determining unit, and an angle offset unit. Each input channel receives chroma components of image data. The octant determining unit determines which octant a given image data occupies. The angle determining unit determines a hue angle of the given image data within an octant. The angle offset unit adjusts the hue angle for the image data according to the octant the image data was determined to occupy.

5 Claims, 4 Drawing Sheets

U.S. PATENT DOCUMENTS

| | | | |
|---|---|---|---|
| 5,933,253 A | 8/1999 | Ito et al. | |
| 5,987,165 A | 11/1999 | Matsuzaki et al. | |
| 5,990,997 A | 11/1999 | Jones et al. | |
| 5,995,669 A | 11/1999 | Shingu et al. | |
| 6,005,968 A * | 12/1999 | Granger | 382/162 |
| 6,023,527 A | 2/2000 | Narahara | |
| 6,054,832 A | 4/2000 | Kunzman et al. | |
| 6,100,872 A | 8/2000 | Aratani et al. | |
| 6,108,053 A | 8/2000 | Pettitt et al. | |
| 6,147,728 A | 11/2000 | Okumura et al. | |
| 6,256,425 B1 | 7/2001 | Kunzman | |
| 6,262,698 B1 | 7/2001 | Blum | |
| 6,297,826 B1 | 10/2001 | Semba et al. | |
| 6,360,008 B1 | 3/2002 | Suzuki et al. | |
| 6,384,836 B1 | 5/2002 | Naylor, Jr. et al. | |
| 6,453,067 B1 | 9/2002 | Morgan et al. | |
| 6,459,419 B1 | 10/2002 | Matsubayashi | |
| 6,483,518 B1 | 11/2002 | Perry et al. | |
| 6,536,904 B2 | 3/2003 | Kunzman | |
| 6,633,302 B1 | 10/2003 | Ohsawa et al. | |
| 6,714,212 B1 | 3/2004 | Tsuboyama et al. | |
| 6,714,243 B1 | 3/2004 | Mathur | |
| 6,724,934 B1 | 4/2004 | Lee et al. | |
| 6,750,874 B1 | 6/2004 | Kim | |
| 6,771,028 B1 | 8/2004 | Winters | |
| 6,781,626 B1 | 8/2004 | Wang | |
| 2001/0019382 A1 | 9/2001 | Song et al. | |
| 2002/0063670 A1 | 5/2002 | Yoshinaga et al. | |
| 2002/0180688 A1 | 12/2002 | Drzaic et al. | |
| 2002/0191130 A1 | 12/2002 | Liang et al. | |
| 2003/0058466 A1 | 3/2003 | Hoshuyama | |
| 2003/0117457 A1 | 6/2003 | Qiao | |
| 2003/0128872 A1 | 7/2003 | Lee et al. | |
| 2003/0151694 A1 | 8/2003 | Lee et al. | |
| 2003/0179212 A1 | 9/2003 | Matsushiro et al. | |
| 2003/0193056 A1 | 10/2003 | Takayama et al. | |
| 2003/0214499 A1 | 11/2003 | Ohsawa et al. | |
| 2004/0046725 A1 | 3/2004 | Lee | |
| 2004/0072380 A1 | 4/2004 | Yamazaki et al. | |
| 2004/0095521 A1 | 5/2004 | Song et al. | |
| 2004/0169807 A1 | 9/2004 | Rho et al. | |
| 2004/0179160 A1 | 9/2004 | Rhee et al. | |
| 2004/0195963 A1 | 10/2004 | Choi et al. | |
| 2004/0222999 A1 | 11/2004 | Choi et al. | |
| 2004/0223005 A1 | 11/2004 | Lee | |
| 2005/0031199 A1 | 2/2005 | Ben-Chorin et al. | |

FOREIGN PATENT DOCUMENTS

| | | |
|---|---|---|
| WO | WO 01/37251 | 5/2001 |
| WO | WO 2004/040548 | 5/2004 |
| WO | WO 2004/086128 | 10/2004 |

* cited by examiner

HUE ANGLE CALCULATION SYSTEM AND METHODS

CROSS REFERENCE TO RELATED APPLICATIONS

The present application is a division of U.S. patent application Ser. No. 10/691,200 (US Publication Number 2005/0083345), filed Oct. 21, 2003—now issued as U.S. Pat. No. 6,980,219—and claims the benefit of its date and is incorporated herein in its entirety.

BACKGROUND

In commonly owned United States Patent Applications: (1) U.S. patent application Ser. No. 09/916,232 ("US Publication Number 2002/0015110, the '110 application"), entitled "ARRANGEMENT OF COLOR PIXELS FOR FULL COLOR IMAGING DEVICES WITH SIMPLIFIED ADDRESSING," filed Jul. 25, 2001; (2) U.S. patent application Ser. No. 10/278,353 ("US Publication Number 2003/0128225, the '225 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) U.S. patent application Ser. No. 10/278,352 ("US Publication Number 2003/0128179, the '179 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) U.S. patent application Ser. No. 10/243,094 ("US Publication Number 2004/0051724, the '724 application"), entitled "IMPROVED FOUR COLOR ARRANGEMENTS AND EMITTERS FOR SUB-PIXEL RENDERING," filed Sep. 13, 2002; (5) U.S. patent application Ser. No. 10/278,328 ("US Publication Number 2003/0117423, the '423 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. patent application Ser. No. 10/278,393 ("US Publication Number 2003/0090581, the '581 application"), entitled "COLOR DISPLAY HAVING HORIZONTAL SUB-PIXEL ARRANGEMENTS AND LAYOUTS," filed Oct. 22, 2002; (7) U.S. patent application Ser. No. 10/347,001 ("US Publication Number 2004/0080479, the '479 application"), entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, novel sub-pixel arrangements are therein disclosed for improving the cost/performance curves for image display devices and herein incorporated by reference.

For certain subpixel repeating groups having an even number of subpixels in a horizontal direction, the following systems and techniques to affect proper dot inversion schemes are disclosed and are herein incorporated by reference: (1) U.S. patent application Ser. No. 10/456,839 ("US Publication Number 2004/0246280, the '280 application"), entitled "IMAGE DEGRADATION CORRECTION IN NOVEL LIQUID CRYSTAL DISPLAYS", filed Jun. 6, 2003; (2) U.S. patent application Ser. No. 10/455,925 ("US Publication Number 2004/0246213, the '213 application"), entitled "DISPLAY PANEL HAVING CROSSOVER CONNECTIONS EFFECTING DOT INVERSION", filed Jun. 6, 2003; (3) U.S. patent application Ser. No. 10/455,931 ("US Publication Number 2004/0246381, the '381 application"), entitled "SYSTEM AND METHOD OF PERFORMING DOT INVERSION WITH STANDARD DRIVERS AND BACKPLANE ON NOVEL DISPLAY PANEL LAYOUTS", filed Jun. 6, 2003; (4) U.S. patent application Ser. No. 10/455,927 ("US Publication Number 2004/0246278, the '278 application"), entitled "SYSTEM AND METHOD FOR COMPENSATING FOR VISUAL EFFECTS UPON PANELS HAVING FIXED PATTERN NOISE WITH REDUCED QUANTIZATION ERROR", filed Jun. 6, 2003; (5) U.S. patent application Ser. No. 10/456,806 ("US Publication Number 2004/0246279, the '279 application"), entitled "DOT INVERSION ON NOVEL DISPLAY PANEL LAYOUTS WITH EXTRA DRIVERS", filed Jun. 6, 2003; and (6) U.S. patent application Ser. No. 10/456,838 ("U.S. Publication No. 2004/0246404, the '404 application"), entitled "LIQUID CRYSTAL DISPLAY BACKPLANE LAYOUTS AND ADDRESSING FOR NON-STANDARD SUBPIXEL ARRANGEMENTS", filed Jun. 6, 2003.

These improvements are particularly pronounced when coupled with sub-pixel rendering (SPR) systems and methods further disclosed in those applications and in commonly owned United States Patent Applications: (1) U.S. patent application Ser. No. 10/051,612 ("US Publication Number 2003/0034992, the '992 application"), entitled "CONVERSION OF RGB PIXEL FORMAT DATA TO PENTILE MATRIX SUB-PIXEL DATA FORMAT," filed Jan. 16, 2002; (2) U.S. patent application Ser. No. 10/150,355 ("US Publication Number 2003/0103058, the '058 application"), entitled "METHODS AND SYSTEMS FOR SUB-PIXEL RENDERING WITH GAMMA ADJUSTMENT," filed May 17, 2002; (3) U.S. patent application Ser. No. 10/215,843 ("US Publication Number 2003/0085906, the '906 application"), entitled "METHODS AND SYSTEMS FOR SUB-PIXEL RENDERING WITH ADAPTIVE FILTERING," filed Aug. 8, 2002; (4) U.S. patent application Ser. No. 10/379,767 ("US Publication Number 2004/0196302, the '302 application"), entitled "SYSTEMS AND METHODS FOR TEMPORAL SUB-PIXEL RENDERING OF IMAGE DATA" filed Mar. 4, 2003; (5) U.S. patent application Ser. No. 10/379,765 ("US Publication Number 2004/0174380, the '380 application"), entitled "SYSTEMS AND METHODS FOR MOTION ADAPTIVE FILTERING," filed Mar. 4, 2003; (6) U.S. patent application Ser. No. 10/379,766 ("US Publication Number 2004/0174375, the '375 application"), entitled "SUB-PIXEL RENDERING SYSTEM AND METHOD FOR IMPROVED DISPLAY VIEWING ANGLES" filed Mar. 4, 2003; (7) U.S. patent application Ser. No. 10/409,413 ("US Publication Number 2004/0196297, the '297 application"), entitled "IMAGE DATA SET WITH EMBEDDED PRE-SUBPIXEL RENDERED IMAGE" filed Apr. 7, 2003, which are hereby incorporated herein by reference.

The present application is related to commonly owned (and filed on even date) United States Patent Applications: (1) U.S. patent application Ser. No. 10/691,377 (US Publication Number 2005/0083341, the '341 application) entitled "METHOD AND APPARATUS FOR CONVERTING FROM SOURCE COLOR SPACE TO RGBW TARGET COLOR SPACE", filed Oct. 21, 2003; (2) U.S. patent application Ser. No. 10/691,396 (US Publication Number 2005/0083352, the '352 application) entitled "METHOD AND APPARATUS FOR CONVERTING FROM A SOURCE COLOR SPACE TO A TARGET COLOR SPACE", filed Oct. 21, 2003; (3) U.S. patent application Ser. No. 10/691,716 (US Publication Number 2005/0083344, the '344 application) entitled "GAMUT CONVERSION SYSTEM AND METHODS", filed Oct. 21, 2003 which are hereby incorporated herein by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

DETAILED DESCRIPTION

Figure 1:
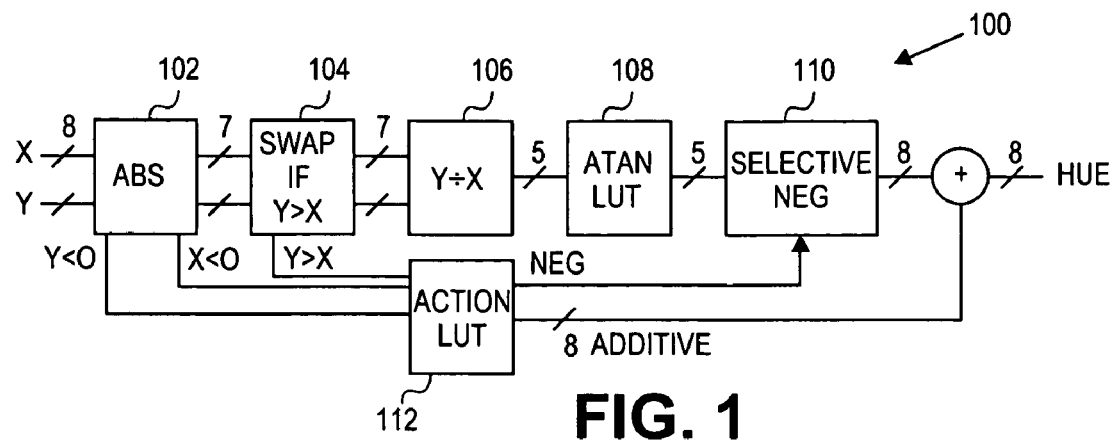
FIG. 1 shows one embodiment of a hue angle calculator as made in accordance with the principles of the present invention.

Reference will now be made in detail to implementations and embodiments, examples of which are illustrated in the accompanying drawings. Wherever possible, the same reference numbers will be used throughout the drawings to refer to the same or like parts.

In the above-listed related applications, there is a need to calculate the hue angle of a given image data set. A novel hue angle calculator and methods will now be described. The color space most often assumed in personal computers will be referred to in this document as sRGB, sometimes called R'G'B' or non-linear RGB. Many color spaces have chroma and luminance separated with the line of grays running up one of the axes. This is not true of sRGB, but it can be converted to one that does. However, for other input formats, it is possible to accept data already in chroma/luminance format, for example YCbCr, Yuv, YIQ, CIE Lab and Luv. In these color spaces, the chroma information is encoded as two signed numbers that describe a 2D color vector. Each system has its own name for these two components; but for the purposes of the following embodiments, they are referred to as "x" and "y" herein.

One possible embodiment of hue angle calculation will now be described. One step in calculating the hue angle to this vector is to record the signs of both components and take their absolute values. This reduces the calculation to one of 4 quadrants. The angle is calculated in one quadrant and then the sign bits determine the actual quadrant and the constant angle to add at the end. For example, in the first quadrant both numbers were positive and the simple angle calculation is correct. In the second quadrant, 90 degrees must be added after calculating the angle from the absolute values, in the third quadrant, 180 degrees must be added and in the fourth quadrant 270 degrees must be added.

However, another embodiment of a hue angle calculator might be to provide a novel color space for doing hue angle, gamut expansion and multi-primary conversion. In this fashion, it might be possible to choose a new number representation that makes the hardware easier to implement. For example, instead of implementing two's compliment numbers, we could store numbers as positive 7-bit numbers with a separate sign bit. This might obviate taking the absolute value. When multiplying or dividing two numbers, the lower 7 bits could be immediately multiplied without addressing the effect of the signs, which would be XORed together to obtain the correct sign of the result. Only in the case of addition would the sign bits need to be tested and negate (compliment and increment) one of the numbers first if the signs are different, or negate afterwards if the result causes a borrow.

In yet another embodiment, there is another symmetry around 45 degrees that can be exploited. Inside the first 45 degrees (i.e. in the first octant), one of the numbers (the x component) is always larger than the other (the y component). Thus, it is possible to test the two components and swap them, if necessary, to make the x component always the larger. When this is done, the fact that y>x is recorded the way the sign bits were saved separately. Once this is done, all calculations can be done as if all the angles are inside the first octant, between 0 and 45 degrees, and symmetry will get you all the rest of the cases. If swapping the x and y components of chroma and calculated the angle, that angle must later be subtracted from 90 degrees to get the correct result for the quadrant.

By trigonometric considerations, the formula for calculating the angle is arctan(y/x). Performing the division, y/x, can be accomplished in any number of ways. One such way would be to use an inversion table to invert the x value and then multiply by the y value. An inversion table may have to be large to be accurate and require a multiplier as large as 12 bits. An alternative way is to implement a division. Optimizations mentioned below may allow this divider module to produce results as small as 5 bits wide. In any event, the result is always a number that is less than or equal to 1 inside the first octant. So the result will always be a binary fixed point number with the binary point before the most significant bit. It should be noted that division by zero is not generally an issue because with the swap of the x and y components until the x is greater than or equal to y, the only time x can be zero is if y is also zero. In that case, the divider circuit could return a zero result, as one possible reasonable default. An interesting case occurs when x=y in which case the result will not fit in a fixed point binary number unless there is one more bit above the binary point. To handle this case, the divider circuit could have an extra bit added for this. Alternatively, the circuit can be allowed to return a slightly smaller number for that special case. Other techniques are possible—it merely suffices that, if the system encounters this problem, then some means are provided to handle it.

The arc-tangent function could be implemented as a small table. In practice, this function is fairly close to a straight line and some practitioners (who have use for an arctan function in other applications) have found that this table can be skipped. If, however, the error introduced by doing this is larger than acceptable limits, it may be desirable to keep the arc tangent table in the system. As described below, this table may be very small and therefore inexpensive.

When taking the absolute values of the x and y components of chroma and swapping them as necessary, bits were saved to allow correcting for these simplifications later. Below is a table of these bits and the actions that must be taken to correct for all the octants:

| Octant | Y < 0 | X < 0 | Y > X | Actions |
|--------|-------|-------|-------|---------|
| 1 | 0 | 0 | 0 | None needed |
| 2 | 0 | 0 | 1 | Subtract angle from 90 |
| 3 | 0 | 1 | 1 | Add angle to 90 |
| 4 | 0 | 1 | 0 | Subtract angle from 180 |

-continued

| Octant | Y < 0 | X < 0 | Y > X | Actions |
|---|---|---|---|---|
| 5 | 1 | 1 | 0 | Add angle to 180 |
| 6 | 1 | 1 | 1 | Subtract angle from 270 |
| 7 | 1 | 0 | 1 | Add angle to 270 |
| 8 | 1 | 0 | 0 | Subtract angle from 360 |

It should be noted that for every different octant, the bit combination of y<0, x<0 and y>x is unique, but when they are listed in octant order like this, the binary number created by concatenating these three bits is not the octant number. It is of course possible to construct the table into this bit address order—or into any bit address order desired, as long as it can uniquely decode to any given octant. Since sometimes the action requires subtracting the angle, it should also be possible to include a bit that indicates the angle must be negated before adding it to the angle offset. The following table is one embodiment of the above observation and may be constructed as a look-up table ("the action LUT") or some other calculation means.

| YX> | NEG | ADD |
|---|---|---|
| 000 | 0 | 0 |
| 001 | 1 | 90 |
| 010 | 1 | 180 |
| 011 | 0 | 90 |
| 100 | 1 | 360 |
| 101 | 0 | 270 |
| 110 | 0 | 180 |
| 111 | 1 | 270 |

The first column in this table, YX> is the binary concatenation of the sign of y, the sign of x and the result of the test y>x. This is the address of the table, now in binary counting order. The second column, NEG, is a bit that indicates after an angle is looked up in the arc tangent table, it must be negated. The arc tangent table will turn out to be so small that we could store both the positive and two's compliment negative in the table and use this bit to select the correct one. The third column in this table is the angle offset added at the end to do the final correction to return an angle between 0 and 360 degrees.

Calculating the angle from the x and y components of chroma will result in an arbitrary choice for the color of hue angle zero. In the case of YCbCr, for example, this will result in zero being a color slightly more magenta than a pure blue. In one example, it is possible to adjust the hue angles so that hue angle zero landed on one of the primary colors. For example, in HSV, red has a hue angle of zero. It is possible to choose one of the primaries to be zero by adding a constant that causes that primary to wrap back around to zero, (modulo 360 degrees). One embodiment does not have to include an additional operation at the end—instead all of the entries in the ADD column of the action table can be adjusted beforehand to generate numbers with the required zero point.

In the discussion above, it has been assumed that angles are measured with 360 degrees around a circle. However, it may be desirable to choose the units of angle to make the resulting values easier to deal with in hardware implementations. For example, if there are 256 "degrees" around a circle then hue angles fit nicely into 8 bits. In addition, there are only 32 of these "degrees" in an octant so the divider circuit has only 5 bits, and the arc-tangent table only has 32 entries of 5 bits each. Calculating angles "modulo 256" is thus a simpler implementation in, for example, an 8 bit adder. For angles greater than 2 pi radians, the system need only allow the adder to overflow and what remains is the correct answer.

FIG. 1 shows one possible implementation embodiment of a hue angle calculator 100 made in accordance with the principles of the present invention. The x and y components of chroma have their absolute values taken at block 102 and the signs may be saved. A test for y>x is done and the two values swapped if true in block 104. The y value is divided by the x value giving the upper 5 bits of the result in block 106. The division result is used as the index to an arc tangent look-up table (LUT) 108. The sign bits and y>x bit are used as an index to the "action" LUT 112 that indicates if the angle should be negated and how much should be added. The angle is selectively negated in block 110 based on that table. An angle offset from the action table is added to the octant angle to get the final hue angle.

Figure 2A:
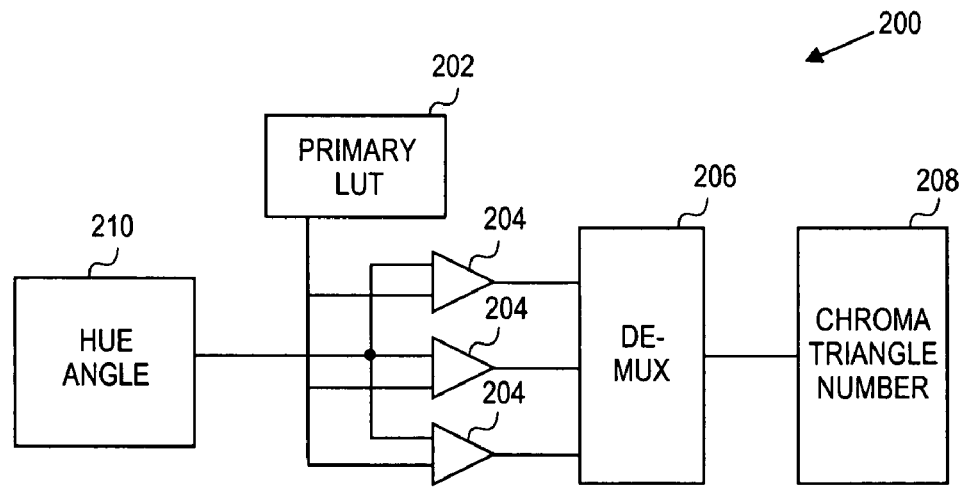
FIGS. 2A and 2B show two embodiments of using hue angle to calculate chromaticity triangle number.
Figure 2B:
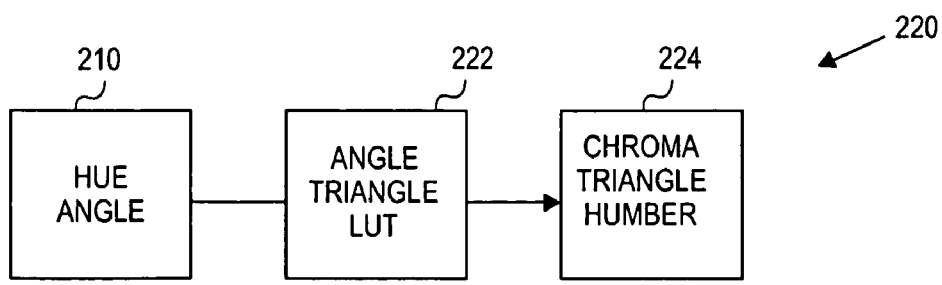
Figure 4A:
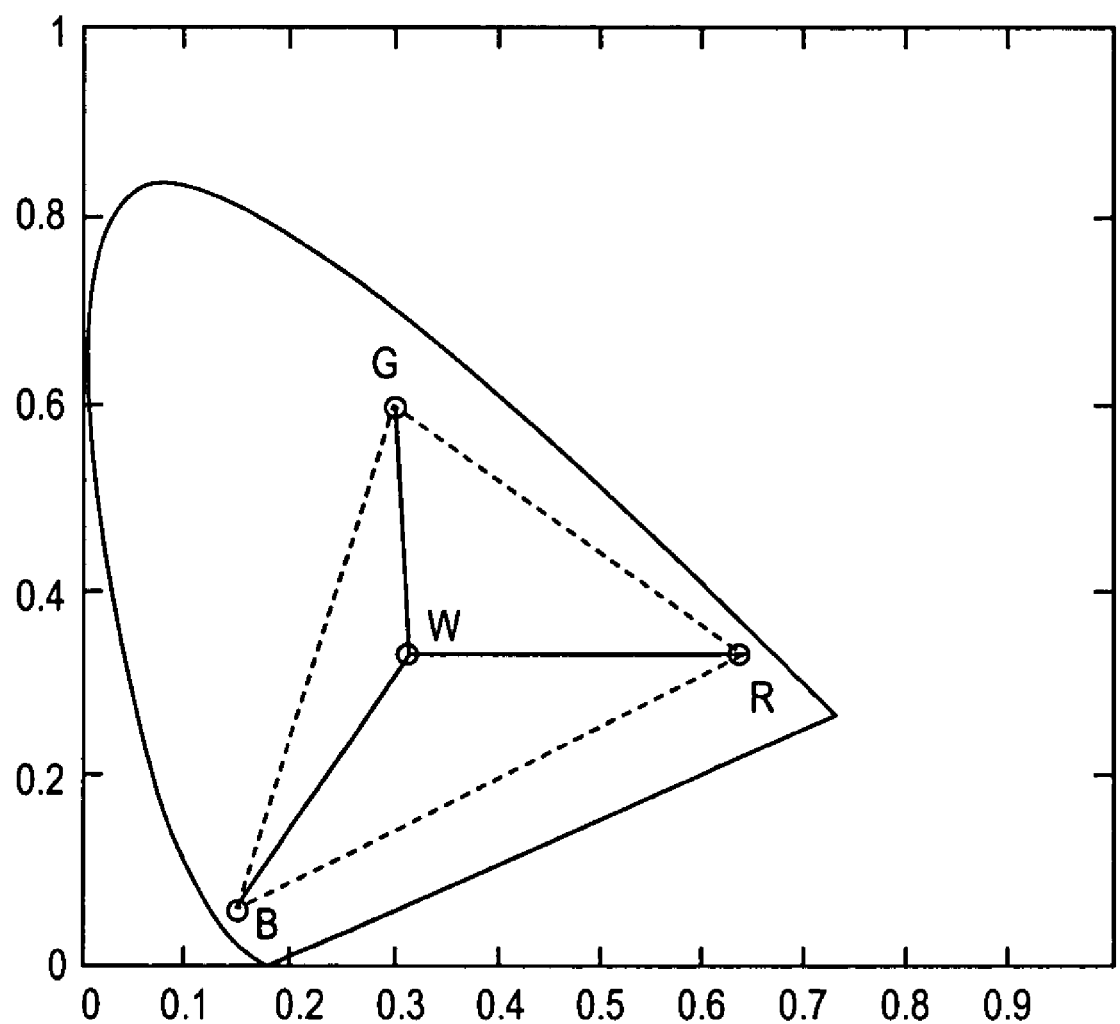
FIG. 4A is the chromaticity chart that shows the three triangular regions resulting from RGBW primaries.

Once the hue angle is calculated, it is often used to determine which triangle of a chromaticity diagram the color belongs in. FIGS. 2A and 2B show two embodiments 200 and 220 of using hue angle to calculate chromaticity triangle number. Referring to FIG. 2A, in the case of a multi-primary display, for example, a plurality of primary colors are pre-converted into hue angles and stored in a primary look-up table (LUT) 202. These are tested against the calculated hue angle 210 in a plurality of comparators 204. A de-multiplexer module 206 converts the results of the comparisons into a chroma triangle number 208. As described in the related applications, the chromaticity diagram with three primaries, R G and B may be divided into three triangles or regions: RGW, GBW and BRW, as shown in FIG. 4A. From the hue angle, the chromaticity triangle number identifies which of these triangles a color belongs in without having to do the computationally expensive task of converting the number to CIE x,y chromaticity.

Referring to FIG. 2B, another embodiment 220 of a hue angle 210 to chroma triangle number is shown. The triangle number for every possible hue angle is pre-calculated and stored in a LUT 222. The hue angle is used as an index to this LUT, fetching the chroma triangle number 224 in one step. This would be particular efficient to implement when the number of hue angle "degrees" around the circle are limited to a power of 2. This may be faster than the embodiment of FIG. 2A but may require more gates to implement.

Figure 3:
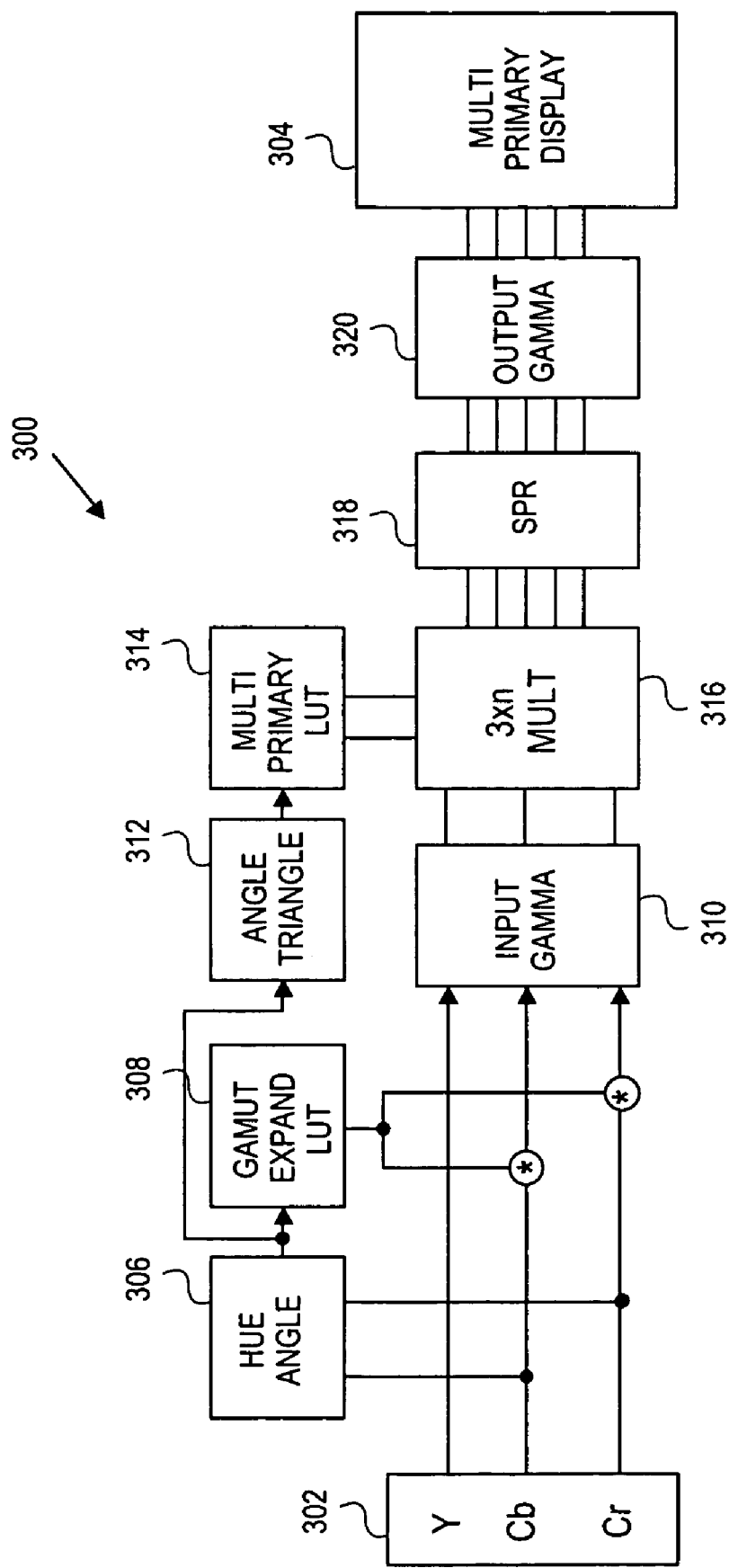
FIG. 3 shows the use of the hue angle calculator for gamut expansion and multi-primary conversion.

FIG. 3 shows a hue angle converter 306 used in a complete "gamut pipeline" 300 that converts digital TV YCbCr signals 302 for output on a multi-primary display 304. The Cb and Cr signals of YCbCr are already a chroma vector and are directly fed to the hue angle calculator 306. The resulting hue angle is used as an index to a gamut expansion LUT 308, as described in the related applications, to generate an expansion scale factor. This is multiplied by the Cb and Cr components to expand the gamut by changing the saturation of the color without changing hue angle or luma. It should be noted that the gamut expansion happens on the uncorrected YCbCr colors, which have an implied non-linear transformation already applied to them. This is also true of other TV signals (YPbPr, YIQ, YUV etc.) and sRGB. The non-linear transformation implied in these signals means that they are perceptually uniform making them ideal color-spaces to do gamut conversion. Other practitioners first convert to the CIE Lab or Luv color-spaces to achieve perceptual uniformity, we have found this computationally expensive step to be unnecessary when using a non-linear space like YCbCr. Once the gamut expansion has been done, an input gamma LUT 310 is used to convert the YCbCr values to a linear color-space which is the correct realm to do color-space conversions and sub-pixel rendering.

In FIG. 3 the hue angle is also used to calculate the chromaticity triangle in module 312, as described above. The chromaticity triangle number is used as an index to a multi-primary matrix LUT 314. The result is 3×n (where n is the number of primaries in the display) coefficients that are multiplied in module 316 by the linear YCbCr values to convert them to the multi-primary display. The multi-primary components are possibly sent to an SPR (Sub Pixel Rendering) module 318, to an output gamma table 320 and finally to the multi-primary display 304.

Figure 4B:
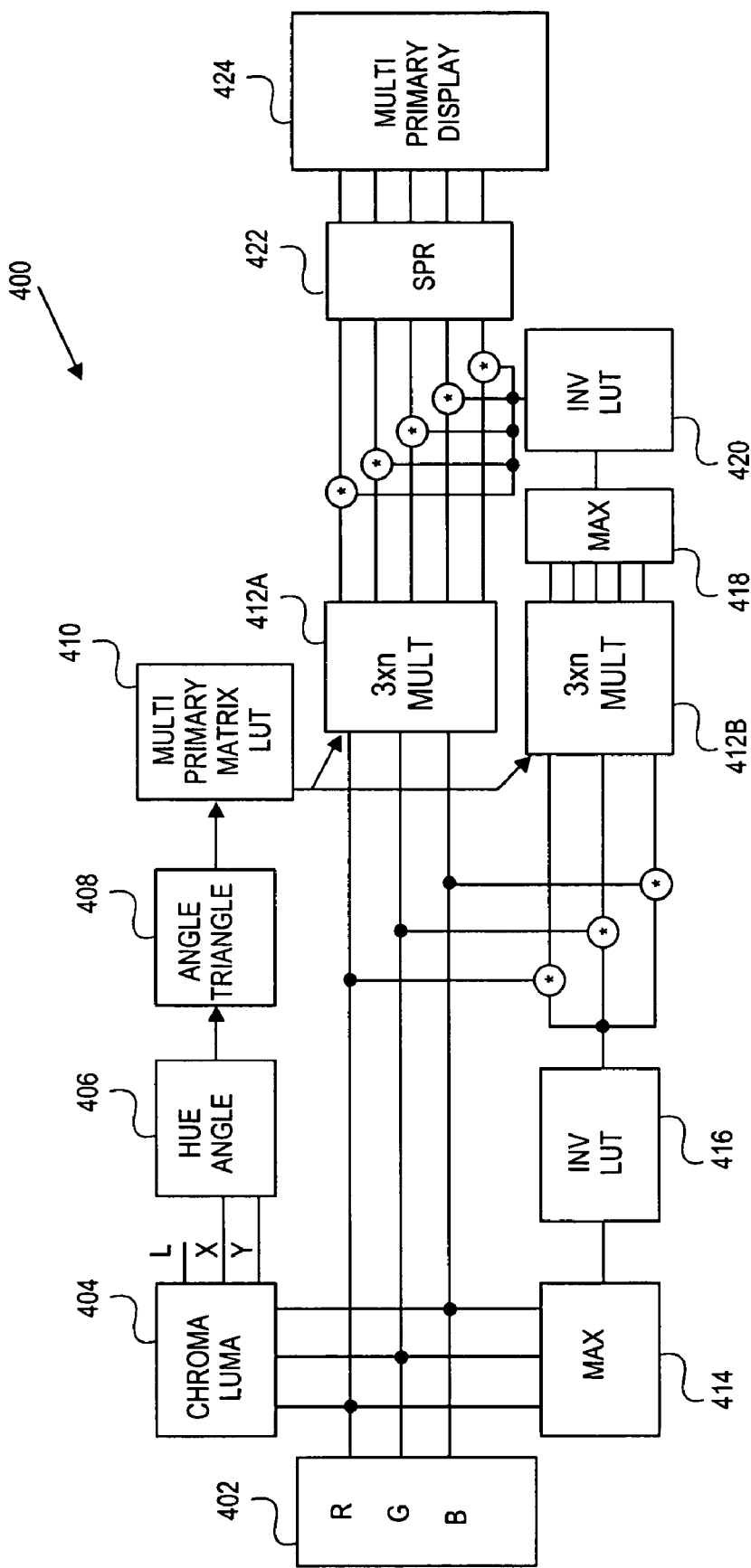
FIG. 4B is another embodiment of the use of the hue angle calculator for gamut expansion and multi-primary conversion in accordance with the principles of the present invention.

FIG. 4B is another embodiment of gamut pipeline 400. In this system, RGB values 402 are input and converted into chroma/luma values at 404. From there, hue angle calculator 406 supplies the hue angle to an angle-triangle unit 408 which determines which chromaticity triangle the image point lies in. This is used to select the multi-primary conversion matrix at 410. This matrix is supplied to the two 3×n mulitipliers 412a and 412b. Multiplier 412a converts the input RGB color to the multi-primary colors-space of display unit 424. The RGB input values are also supplied max unit 414 which find the maximum of the three color components and this maximum is supplied to a inverse LUT 416 which produces a scale factor to normalize the RGB values to the maximum with the same hue angle. This scale factor is multiplied to the RGB input values to produce the maximum allowed color that has the same hue angle as the original RGB values. Multiplier 412b takes that maximized hue color and converts it to the target multi-primary color space. That data is fed into max unit 418 which finds the largest of the multi-components and an inverse LUT 420 converts that into a scale factor to be multiplied with the particular multi-primary values output from multiplier 412a. The result of this system is a color point in the target multi-primary space that has been expanded or contracted to the gamut of the multi-primary display 424. Before rendering on the display, however, this data may be optionally subpixel rendered by SPR unit 422 as described in any of the above incorporated references.

In the above embodiments, reference to functional blocks can be implemented using any combination of hardware and/or software, including components or modules such as one or more memory devices or circuitry. For example, a programmable gate array or like circuitry can be configured to implement such functional blocks. In other examples, a microprocessor operating a program in memory can also implement such functional blocks.

Thus, while the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An image processing method, said method comprising:
rendering image data with a plurality of primaries;
calculating hue angles of said primaries for rendering said image data;
selecting a chromaticity triangle wherein an input image point resides; and
accessing a multiprimary matrix look-up table to obtain coefficients to convert said image data for rendering upon a display, said coefficients determined according to said chromaticity triangle selected.

2. The image processing method of claim 1 wherein said method further comprises:
comparing the angles of said primaries to the hue angle of the input image point wherein said selecting is done using a selector that comprises a demultiplexer.

3. The image processing method of claim 1 wherein said selecting comprises accessing a look-up table of pre-calculated triangle numbers.

4. An image processing method, said method comprising:
rendering image data with a plurality of primaries;
calculating hue angles of said primaries for rendering said image data;
selecting a chromaticity triangle wherein said image point resides by using a selector comprising a demultiplexer;
comparing the angles of said primaries to the hue angle of an input image point.

5. An image processing method, said method comprising:
rendering image data with a plurality of primaries;
calculating hue angles of said primaries for rendering said image data;
selecting a chromaticity triangle wherein said image point resides by using a selector comprising a look-up table of pre-calculated triangle numbers.

* * * * *